FREQUENCY MODULATED OSCILLATOR

Filed March 10, 1961

INVENTOR.
RAYMOND A. RUNYAN
BY
Kenyon & Kenyon
ATTORNEYS

United States Patent Office 3,253,237

Patented May 24, 1966

3,253,237
FREQUENCY MODULATED OSCILLATOR

Raymond A. Runyan, Ridgefield, Conn., assignor to Data-Control Systems, Inc., Danbury, Conn., a corporation of Delaware Filed Mar. 10, 1961, Ser. No. 94,884
7 Claims. (Cl. 332—16)

This invention relates generally to a circuit arrangement for demodulating a recorded frequency modulated carrier to produce a modulation component which is essentially free from distortion due to differences between recording speed and play-back speed. More particularly, this invention relates to an oscillator which is responsive to two discrete voltage signals.

In the communications field, there is a circuit arrangement known as a phase-locked loop discriminator (see Proceedings of the IRE, August 1953, pages 1043 through 1048; Margolis, S. C., "Response to a Phase-Locked Loop to a Sinusoid Plus Noise," IRE Transactions on Information Theory, June 1957, pp. 136–143; and Gruen, W. J., "Theory of AFC Synchronization," IRE, Pros. August 1953). Briefly, a phase-locked loop discriminator comprises a phase detector, a frequency control stage and local oscillator. A frequency modulated carrier is introduced into the phase detector along with a reference signal from the local oscillator. The phase detector produces an output signal which is indicative of the phase difference between the reference signal and the incoming frequency modulated carrier. The output signal of the phase detector is introduced into the frequency control stage, which in turn controls the frequency of the local oscillator in such fashion that the local oscillator tracks, i.e., is synchronized with, the frequency of the incoming modulated carrier. The output signal of the phase detector represents the time rate of change of the frequency of the modulated carrier, and, accordingly, this output represents the modulation component of the carrier.

In certain communications systems it is desirable to record a frequency modulated carrier as it is received and to subsequently play back the recording and demodulate the resulting signal. An example of such a situation is in the telementry field where signals from a rocket or missile may be recorded at receiving stations on the ground, and the information contained in the recorded signals being subsequently extracted. Variations in the speed of recording will change the frequency of the recorded carriers and such changes will be indistinguishable from the original frequency modulation. Unless the play-back speed matches the recording speed exactly in the sense that the variations in recording speed are duplicated during play-back, such changes in the frequency of the carrier will not be cancelled out. Additional changes may be introduced. Thus, the modulation component obtained by demodulation of the played-back signal would not be a true representation of the information originally impressed on the carrier.

Accordingly, it is an object of the present invention to provide a circuit arrangement for demodulating recorded frequency modulated carriers to produce a modulation component which is essentially free from distortion resulting from differences between the recording speed and the play-back speed.

It is a further object of this invention to provide a circuit arrangement suitable for use in a phase-locked loop to demodulate recorded frequency modulated carriers and thereby produce a modulation component which is essentially free from distortion resulting from differences between the recording speed and the play-back speed.

It is another object of this invention to provide an oscillator which is responsive to two discrete voltage signals.

Briefly stated, the circuit arrangement of the present invention, in its broader sense, provides a method for demodulating a recorded frequency modulated carrier to produce a modulation component which is free from distortion resulting from differences between the speed at which the frequency modulated carrier was recorded and the speed at which the signal was played back. In order to utilize the circuit arrangement of the present invention it is necessary to record the frequency modulated carrier in a prescribed manner. This requisite consists of simultaneously recording on the same recording medium the frequency modulated carrier and a reference signal, the latter being, for example, a signal from a crystal controlled oscillator. Any variation in the recording speed will be reflected in a modification of the frequency of the reference signal.

As the first step in demodulating the frequency modulated carrier in accordance with this invention, the recording medium on which the carrier and the reference signal are transcribed is played back in equipment conventionally used for such purpose. Unless the play-back speed exactly duplicates the recording speed the frequency of the reference signal will be further modified. The net result of such uncompensated variations in the recording and play-back speed will thus be reflected as intermittent or continuous changes in the frequency of the reference signal, that is to say, the reference signal will be frequency modulated. Thus, the errors or distortion introduced by the recording and subsequent play-back of the frequency modulated signal will be represented by the modulation component of the reference signal.

The output of the play-back apparatus is introduced into a filter network which separates the reference signal from the frequency modulated carrier. The reference signal is then fed to a discriminator which demodulates the signal to produce the modulation component thereof.

The balance of the circuit arrangement of the present invention is a phase-locked loop comprising a phase detector frequency control stage and an oscillator which is sensitive to either or both of two voltage signals. The frequency modulated signal is fed from the filter network into the phase detector. Also fed into the phase detector is the output of the local oscilator. The output signal of the phase detector represents the modulation component of the frequency modulated signal. As is well known in the art, this output is also introduced through the frequency control stage into the local oscillator to cause it to track the frequency modulated signal. Accordingly, the local oscillator must be responsive to the signal received from the phase detector and must change its frequency accordingly.

The modulation component of the reference signal is also introduced into the local oscillator as a control voltage, and the frequency output of the local oscillator varies in accordance with this signal also. In this manner the distortion caused by differences in the recording speed and play-back speed of a frequency modulated signal are eliminated during the course of demodulating the signal.

The invention will be readily understood when taken in conjunction with the following drawings, wherein.

Figure 1:
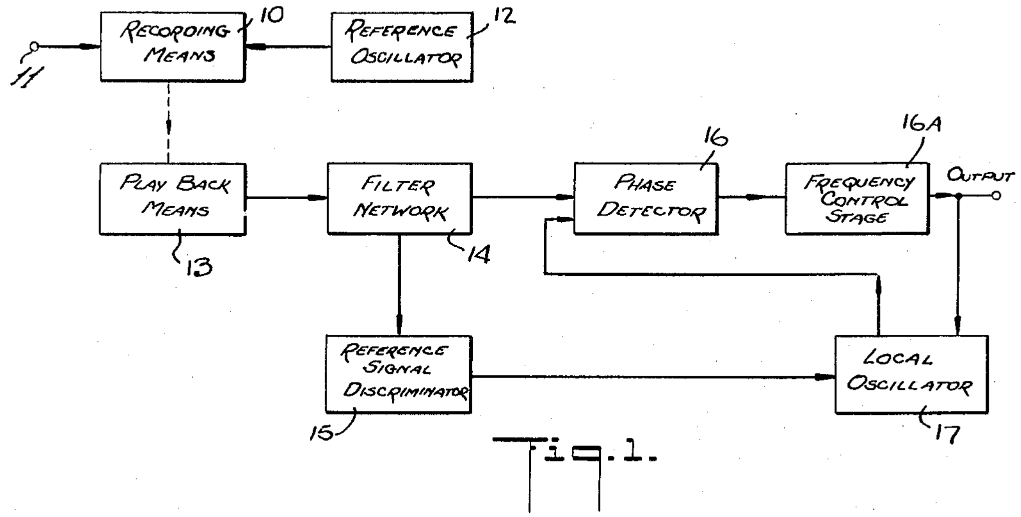
FIG. 1 is a block diagram of the circuit arrangement of this invention.

Referring now to FIG. 1, there is depicted recording means 10 which records on a single recording medium a frequency modulated signal appearing at terminal 11 and a reference signal produced by reference oscillator 12.

The frequency modulated signal on the recording medium produced by recording means 10 is then introduced into play-back means 13. It is to be understood that play back may also be effected by using the recording means 10, such equipment being presently commercially available. Play-back means 13 produces a signal composed of the frequency modulated carrier and the reference signal.

The output of play-back means 13 is introduced through filter network 14 into reference signal discriminator 15 to demodulate the reference signal. The modulation component produced by discriminator 15 represents variations between the recording and play back speeds. Discriminator 15 may be of any known type used for demodulating a frequency modulated signal.

The frequency modulated carrier is introduced into phase detector 16 which, along with frequency control stage 16A and local oscillator 17, comprises a phase-locked loop. In accordance with the well known operation of a phase-locked loop the output of local oscillator 17 is introduced into phase detector 16. The output of phase detector 16 is the modulation component of the frequency modulated carrier. The output of phase detector 16 is fed through frequency control stage 16A to local oscillator 17 and local oscillator 17 is thus caused to track the frequency modulated carrier.

The output of reference signal discriminator 15, representing the frequency distortion introduced by differences between the recording speed and the play back speed is also introduced into local oscillator 17. In this manner the frequency of local oscillator 17 changes in accordance with the signal from discriminator 15 and the output of phase detector 16 is thus corrected for any variations in the frequency of the frequency modulated carrier which resulted from differences between the recording speed and the play back speed.

The operation of the circuit arrangement of FIG. 1 is dependent largely on the design of local oscillator 17. This oscillator is designed to produce an output signal whose frequency varies in response to two separate voltage inputs. The operation of this oscillator is best described by reference to FIG. 2.

Figure 2:
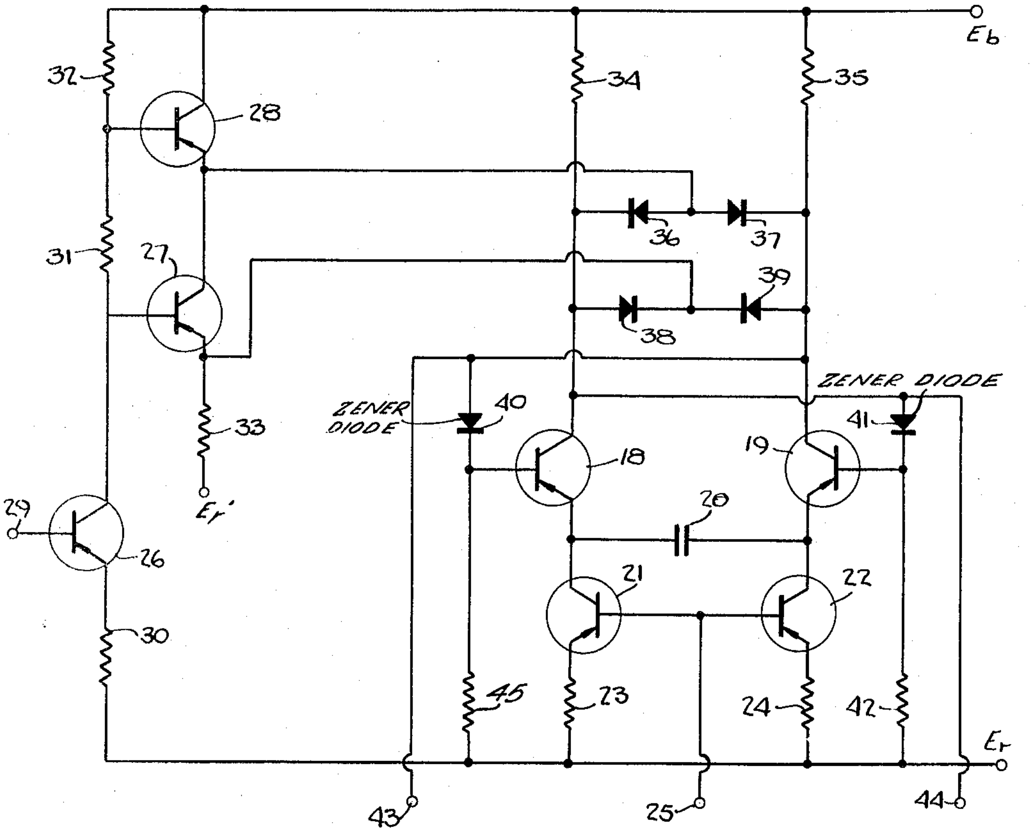
FIG. 2 is a schematic diagram of the local oscillator employed in the circuit arrangement of FIG. 1.

As shown in FIG. 2, the local oscillator is in essence a bistable multivibrator whose operation is dependent on the cut-off characteristics of cross-coupled transistors 18 and 19.

The value of the capacitor 20 and the time required for this capacitor to charge is one factor which affects the frequency of the multivibrator.

Depending upon which one of the transistors 18 and 19 is conducting, capacitor 20 charges either by virtue of the current flowing through transistor 21 or the current flowing through transistor 22. Thus, for example, if transistor 18 is conducting, the collector current from transistor 21 flows through transistor 18 whereas the collector current directly from transistor 22 first flows through capacitor 20. The rate at which capacitor 20 charges accordingly may be varied by changing the current flow through either transistor 21 or transistor 22, as the case may be. The current flowing through transistors 21 and 22, in turn, may be controlled by changing the voltage on the base elements of these transistors.

Resistors 23 and 24 in the respective emitter circuits of transistors 21 and 22 serve to generate the above current in conjunction with voltage reference $E_r$ and the impressed base voltage on transistors 21 and 22.

The output from phase detector 16 is introduced through the frequency control stage 16A into local oscillator 17 at terminal 25. As shown in FIG. 2, terminal 25 is connected to the base elements of transistors 21 and 22.

The currents flowing through transistors 21 and 22 are governed by the magnitude and sense of the voltage appearing at terminal 25. Since, as stated above, the rate of charge of capacitor 20 is a factor in determining the frequency at which the multivibrator oscillates, it can be seen that the frequency of the multivibrator will vary in accordance with the output of phase detector 16 which appears at terminal 25.

The local oscillator 17 is caused to vary its output frequency in response to the signal from discriminator 15 by use of that portion of the circuit shown in FIG. 2 involving transistors 26, 27 and 28. The signal from discriminator 15 is introduced into the circuit through terminal 29, the latter being directly connected to the base element of transistor 26. To simplify the description of this portion of the circuit, it will be assumed at this point that the voltage appearing at terminal 29 is constant.

The current flowing through transistor 26 is dependent on the values of resistor 30, and also on the values of reference potential $E_r$ and the voltage appearing at terminal 29. The respective voltages at the base elements of transistors 27 and 28 are determined by the current flowing through transistor 26 and the resultant voltage drop across resistors 31 and 32.

Transistors 27 and 28 together with resistors 33, 34 and 35 and diodes 36, 37, 38 and 39 serve to clamp the voltages appearing at the collector elements of transistors 18 and 19. The collector element of transistor 28 is directly connected to reference potential $E_b$ and the collector element of transistor 27 is connected to reference potential $E_b$ through three paths, to wit, through diode 36 and resistor 34, through diode 37 and resistor 35, and through transistor 28. The emitter of transistor 27 is connected through resistor 33 to reference voltage $E_r'$.

Assume a condition in which transistor 19 is conducting and transistor 18 is not. Diode 39 will conduct under conditions in which the voltage on one side is a certain value relative to the voltage appearing at the other element. One side of diode 39 is connected to the collector of transistor 19 and the other side is connected to the emitter of transistor 27. When the current flow through transistor 19 increases to a certain point, determined by the particular values of the components employed, diode 39 will become conductive by reason of the increasing voltage drop across resistor 35. In such a situation, current flow would be through diode 39 and transistors 27 and 28 to reference potential $E_b$. It is to be noted that variations in the emitter voltage of transistor 27 caused for example by variations in the voltage on the base element of transistor 27 will affect the limiting action of diode 39 on the collector voltage of transistor 19. That is to say that diode 39 will become conductive at collector voltages determined by the voltage at the emitter of transistor 27.

Diode 38 serves the same purpose for transistor 18 as that described above in conjunction with diode 39 and transistor 19.

As can be seen in FIG. 2 the polarities of diodes 36 and 37 are reversed as compared with those of diodes 38 and 39. Accordingly, diode 37, for example, will conduct at a point when the voltage drop across resistor 35 decreases to a relatively low value, as contrasted with diode 39 which becomes conductive when the voltage drop across transistor 35 increases to a relatively high value. When diode 37 commences to conduct, current flows from the collector of transistor 27 through diode 37 and resistor 35 to reference level $E_b$.

The operation of diodes 36 and 37 is keyed to the potential level appearing at the emitter of transistor 28. The emitter of transistor 28 is at a potential which is greater than that of the emitter of transistor 27 by the approximate voltage drop across resistor 31. Thus, as in the case of diodes 38 and 39, a change in the current flowing through transistor 26 affects the voltage drop across resistor 32 which in turn determines the point at which diodes 36 and 37 commence to conduct.

From the foregoing explanation it can be seen that diodes 36 through 39, in conjunction with other components of the circuit, serve to limit both the maximum and minimum voltages which appear at the respective collector elements of transistors 18 and 19.

As shown in FIG. 2 the collector element of transistor 19 is connected to the base element of transistor 18 through Zener diode 40. The junction of Zener diode 40 and base element of transistor 18 is connected to reference potential $E_r$ through resistor 45. The same type of cross-coupling between the collector of transistor 18 and base element of transistor 19 is effected by use of Zener diode 41 and resistor 42. Thus, the potential appearing at the base element of transistor 19 is governed by the collector voltage of transistor 18, and the potential appearing at the base element of transistor 18 is governed by the collector voltage of transistor 19.

Assume a situation in which transistor 19 is conducting and transistor 18 is not. The collector voltage of transistor 19 is determined by diode 39 and the collector voltage of transistor 18 is determined by diode 36 as described above. The base voltage of transistor 19 is determined by the collector voltage of transistor 18 and the Zener voltage of diode 41, and the base voltage of transistor 18 is determined by the collector voltage of transistor 19 and the Zener voltage of diode 40. When the multivibrator switches, that is as transistor 18 starts to conduct and transistor 19 ceases to conduct, the collector of transistor 19 falls from the potential of the emitter of transistor 27 to the potential of the emitter of transistor 28 due to the action of diodes 39 and 37. The potential of the base of transistor 18 falls an equal amount due to the Zener action of diode 40. The emitter of transistor 18 follows its base because it is conducting. Both sides of capacitor 20 follow the emitter of transistor 18 because of the relatively fast switching action. The emitter of transistor 19 follows the action of capacitor 20 because transistor 19 is not conducting.

The collector of transistor 18 rises from the potential of the emitter of transistor 28 to the potential of the emitter of transistor 27 because of the action of diodes 36 and 38 as described above. The potential of the base of transistor 19 rises an equal amount due to the Zener action of diode 41.

Therefore, a potential difference of twice the difference of potential between the emitters of transistors 27 and 28 is developed across the base-emitter diode of transistor 19.

The current through transistor 22 flows through capacitor 20, charging it in a linear fashion toward the new base potential of transistor 19. When this potential is reached, transistor 19 starts to conduct causing the above chain of reactions to repeat in a conjugate manner.

The same analysis is applicable to the condition wherein transistor 18 is conducting and transistor 19 is not.

If a signal is introduced at terminal 29, the current flowing through transistor 26 will vary accordingly. This variation in turn affects the voltage on the base elements of transistors 27 and 28 and also determines, in the manner discussed above, the maximum and minimum voltages at the respective collectors of transistors 18 and 19. Assume that transistor 19 is conducting and transistor 18 is not. Assume further that the voltage at terminal 29 increases. The increase in voltage at the base terminal of transistor 26 will decrease the current flowing through the transistor. This in turn reduces the voltage drop across resistors 31 and 32. This causes the current flowing through transistor 27 to increase and the voltage drop across resistor 33 to increase and the emitter of transistor 27 becomes more negative. Accordingly, in the next conducting cycle of transistor 19, diode 39 will commence to conduct at a time when the collector voltage is more negative than in the previous cycle. In other words, the limiting action of diode 39 will occur sooner than the previous cycle and at a more negative collector voltage.

The same action exists when transistor 19 is non-conducting. The decrease in current flow through transistor 26 results in a decrease in voltage drop across resistor 32, which causes the voltage at the emitter element of transistor 28 to become more negative. Therefore, diode 37's limiting action will occur sooner than the previousl cycle and at a more negative collector voltage on transistor 19.

Note that the relative action between the conducting and nonconducting states is not of the same amplitude. The decrease in current through resistor 31 as stated above causes a decrease in the voltage drop across resistor 31 and a decrease in the potential difference between the emitter elements of transistors 27 and 28. As stated above, the potential across the base emitter diode of transistor 18 at time of switching, and thus the potential through which capacitor 20 must charge in order to switch the multivibrator, is twice the potential between the emitter elements of transistors 27 and 28. If transistors 21 and 22 have a constant voltage on their base elements, they generate a constant current and capacitor 20 will charge at a constant rate. Since capacitor 20 must charge through a decreased potential difference, there will be less time between multivibrator switching and the resultant multivibrator center frequency will be increased.

By similar analysis it may be shown that a decrease in voltage at terminal 29 causes a decrease in the frequency of the multivibrator.

Referring again to the action of transistors 21 and 22, a decrease in the voltage at terminal 25 causes the current flowing through transistors 21 and 22 to increase. This increase in current decreases the time necessary for capacitor 20 to charge, and this in turn accelerates the rate at which transistors 18 and 19 commence to conduct. In other words, a decrease in the voltage appearance at terminal 25 causes an increase in the frequency of the multivibrator.

The output of local oscillator 17 appears between terminals 43 and 44, connected to the collector elements of transistors 19 and 18, respectively. Thus output is introduced into phase detector 16 as shown in FIG. 1.

The local oscillator depicted in FIG. 2 has been determined to be very stable in operation. In addition, excellent linearity of response is obtained. An important advantage of the local oscillator is the fact that the oscillator frequency may be varied from approximately 200 cycles per second to 500 kilocycles with deviations from center frequency as high as 40 percent merely by changing the value of capacitor 20.

What has been discussed above is a circuit arrangement which can be used to demodulate recorded frequency modulated carriers without introducing errors or distortions caused by variations in the recording speed or the play-back speed. Also discussed herein is one form of local oscillator which is advantageously employed in the circuit arrangement discussed above. The frequency of this local oscillator may be varied in response to either or both of two separate voltage signals. Variations in the circuit arrangements discussed herein may be made by one skilled in the art without departing from the spirit and scope of the invention.

I claim:

1. A frequency modulated oscillator whose center frequency may be varied in response to an error signal comprising a voltage responsive multivibrator constituted by a pair of cross-coupled transistors, means responsive to a modulating signal to modulate the output of the said multivibrator by varying the rate of change of the relative potentials of the respective emitter elements of the said pair of transistors thereby changing the rate of change of the emitter-to-base bias voltage of each of said pair of transistors, means for limiting the collector element of each of said transistors to predetermined maximum and minimum relative potentials each corresponding to a different one of the conducting and non-conducting conditions of each of said transistors, and means responsive to said error signal for biasing said limiting means to change the center frequency of said multivibrator by changing the relative potentials of the respective collector elements thereby changing the emitter-to-base bias of each of said pair of transistors.

2. A voltage-responsive frequency modulated oscillator whose center frequency may be electrically varied in response to a voltage signal comprising a multivibrator constituted by a pair of alternately conducting cross-coupled transistors, a pair of unidirectional devices having a constant potential thereacross, the collector element of the first of said pair of transistors being coupled to the base element of the second of said pair of transistors and the collector element of the second of said pair of transistors being coupled to the base element of the first of said pair of transistors by a different one of said pair of unidirectional devices, means responsive to a modulating signal to vary the rate of change of the relative potentials of the respective emitters of said pair of transistors, means for limiting the collector elements of each of said transistors to predetermined maximum and minimum relative potentials corresponding respectively to the conducting and non-conducting conditions of each of said transistors, and means responsive to said voltage signal for biasing said limiting means to vary the respective collector potentials of the said pair of transistors.

3. An oscillator responsive to two separate signal voltages comprising a multivibrator constituted by a pair of alternately conducting transistors which are cross-coupled from collector element to base element, a capacitance element connected between the emitter elements of said pair of transistors, a first means responsive to the first of said voltage signals to vary the rate of charge of said capacitive element thereby varying the rate of change of the emitter-to-base bias of the transistors whereby the frequency of the multivibrator is varied, a second means responsive to the second of said voltage signals to vary the collector potential of the conducting transistor with respect to a predetermined maximum potential in accordance with the magnitude and sense of said second voltage, and a third means to vary the collector potential of the non-conducting transistor with respect to a predetermined minimum potential in accordance with the magnitude and sense of the said second signal voltage, whereby said second and said third means produce a variation in the emitter-to-base bias and vary the frequency of the multivibrator accordingly.

4. A frequency modulated oscillator whose center frequency may be varied in response to an error voltage comprising a cross-coupled multivibrator constituted by a first transistor and a second transistor which are alternately conducting, a capacitance element connected between the emitter element of said first transistor and the emitter element of said second transistor, means for limiting the collector element of each of said first and second transistors to maximum and minimum potentials corresponding respectively to the conducting and non-conducting conditions of each of said transistors a third transistor whose collector element is connected to the junction of said capacitance element with the emitter element of said first transistor, a fourth transistor whose collector element is connected to the junction of said capacitance element with the emitter of said second transistor, means connecting the base elements of said third and said fourth transistors, means to apply a modulating signal to the base elements of said third and said fourth transistors thereby causing a change in the rate of charge of said capacitance element whereby the frequency of said multivibrator is varied, and means responsive to the said error voltage for biasing said limiting means to control the respective collector potentials of said first and said second transistors, whereby the center frequency of said multivibrator is adjusted.

5. A frequency modulated oscillator whose center frequency may be varied in response to an error voltage comprising a pair of alternately conducting transistors which are collector-to-base cross-coupled, means responsive to a modulating signal to vary the relative rate of change of the emitter potentials of said pair of transistors whereby the frequency of said multivibrator is modulated, means responsive to said error voltage to provide two discrete potential levels which differ one from the other in accordance with magnitude and sense of said error voltage, a limiter including unidirectional conducting means providing maximum and minimum limiting potentials, said limiter connecting the respective collector elements of said pair of transistors to each of said potential levels to vary the respective collector potentials of the conducting one and the non-conducting one of said pair of transistors whereby the frequency of said multivibrator is varied in accordance with said error voltage.

6. A voltage-responsive frequency modulated oscillator whose center frequency may be adjusted in response to an error voltage comprising a multivibrator constituted by a pair of alternately conducting transistors, a capacitance element connected between the emitter elements of said pair of transistors, means responsive to a modulating signal connected to said capacitance element to control the current flow therethrough whereby the rate of change of the relative emitter potentials are varied in accordance with the said modulating signal, a pair of asymmetrical conducting elements connected to cross-couple the collector-base elements of said pair of transistors, means responsive to said error voltage to produce a first and a second potential level whose respective magnitudes vary in accordance with the amplitude and sense of the said error voltage, a limiter including unidirectional conducting means providing maximum and minimum limiting potentials, said limiter connecting the respective collector elements of said pair of transistors to each of said first and said second potential levels, whereby the respective collector potentials of the conducting one and the non-conducting one of said pair of transistors are varied in accordance with said error voltage.

7. A frequency modulated oscillator whose center frequency may be varied in response to an error voltage comprising a cross-coupled multivibrator constituted by a first transistor and a second transistor which are alternately conducting, a capacitance element connected between the emitter element of said first transistor and the emitter element of said second transistor, a third transistor whose collector element is connected to the junction of said capacitance element with the emitter element of said first transistor, a fourth transistor whose collector element is connected to the junction of said capacitance element with the emitter of said second transistor, means connecting the base elements of said third and said fourth transistors, means to apply a modulating signal to the base elements of said third and said fourth transistors thereby causing a change in the rate of charge of said capacitance element whereby the frequency of said multivibrator is varied, a pair of diode means, each having an opposite polarity for limiting the collector elements of each of said transistors to predetermined maximum and minimum relative potentials corresponding respectively to the conducting and non-conducting conditions of each of said first and second transistors, fifth and sixth transistors each coupled to a different one of said pair of diode means, said fifth and sixth transistors in response to said error signal biasing said diode limiting means, whereby the respective collector potentials of said first and said second transistors connected to said diode limiting means are controlled to adjust the center frequency of said multivibrator.

References Cited by the Examiner

UNITED STATES PATENTS

| | | | |
|---|---|---|---|
| 2,417,717 | 3/1947 | Tellier | 329—122 |
| 2,727,097 | 12/1955 | Frayne | 179—100.2 |
| 2,783,380 | 2/1957 | Bonn | 332—16 |
| 2,787,712 | 4/1957 | Priebe et al. | 331—113 |
| 2,854,526 | 9/1958 | Morgan | 179—100.2 |
| 2,894,215 | 7/1959 | Toy | 332—16 |
| 2,937,273 | 5/1960 | Franco | 329—122 |
| 2,937,342 | 5/1960 | Wellman | 332—16 |
| 2,994,043 | 7/1961 | Ott | 332—16 |
| 3,013,220 | 12/1961 | Norris | 332—14 X |
| 3,037,172 | 5/1962 | Biard | 332—14 |
| 3,077,567 | 2/1963 | Gray | 331—113 X |

ROY LAKE, *Primary Examiner.*

ROBERT H. ROSE, ALFRED L. BRODY, *Examiners.*